US005587591A

United States Patent [19]
Kingsley et al.

[11] Patent Number: 5,587,591
[45] Date of Patent: Dec. 24, 1996

[54] SOLID STATE FLUOROSCOPIC RADIATION IMAGER WITH THIN FILM TRANSISTOR ADDRESSABLE ARRAY

[75] Inventors: Jack D. Kingsley, Grand Junction, Colo.; George E. Possin, Schenectady, N.Y.

[73] Assignee: General Electric Company, Schenectady, N.Y.

[21] Appl. No.: 174,921

[22] Filed: Dec. 29, 1993

[51] Int. Cl.⁶ .................................................. H01L 29/04
[52] U.S. Cl. ........................ 257/59; 257/292; 257/443; 257/448
[58] Field of Search ............................ 250/208.1, 214.1, 250/370.09, 370.11, 370.14; 257/57, 59, 61, 72, 291, 292, 443, 444, 448, 459

[56] References Cited

U.S. PATENT DOCUMENTS

| | | | |
|---|---|---|---|
| 5,017,989 | 5/1991 | Street et al. | 357/30 |
| 5,079,426 | 1/1992 | Antonuk et al. | 250/370.09 |
| 5,117,114 | 5/1992 | Street et al. | 250/370.11 |
| 5,153,438 | 10/1992 | Kingsley et al. | 250/370.09 |
| 5,187,369 | 2/1993 | Kingsley et al. | 250/370.11 |
| 5,233,181 | 8/1993 | Kwasnick et al. | 250/208.1 |
| 5,262,649 | 11/1993 | Antonuk et al. | 250/370.11 |

OTHER PUBLICATIONS

Application entitled, "Solid State Radiation Imager With High Integrity Barrier Layer and Method of Fabrication," Ser. No. 08/099,370, filed Jul. 29, 1993., Kwasnick.
Application entitled, "Method for Fabricating Solid State Radiation Imager Having Improved Scintillator Adhesion," Ser. No. 08/115,084, filed Sep. 2, 1993., Kwasnick.
Donald E. Castleberry, "A 1 Mega-Pixel Color a-Si TFT Liquid-Crystal Display," SID 88 Digest, 1988, pp. 232–234. Please Note: Liquid Crystal Technology Described Herein Was Sold by GE Prior to Dec. 29, 1992.
Fang-Chen Luo et al., "Fabrication of a-Si TFT-LC Color Display Panels," SID 88 Digest, 1988, pp. 235–237.

*Primary Examiner*—J. Carroll
*Assistant Examiner*—Minhloan Tran
*Attorney, Agent, or Firm*—Donald S. Ingraham; Marvin Snyder

[57] ABSTRACT

A low noise fluoroscopic radiation imager includes a large area photosensor array having a plurality of photosensors arranged in a pattern so as to have a predetermined pitch, and a low noise addressable thin film transistor (TFT) array electrically coupled to the photosensors. The TFT array includes a plurality of low charge retention TFTs, each of which have a switched silicon region that has an area in microns not greater than the value of the pitch of the imager array expressed in microns. The portion of the switched silicon region underlying the source and drain electrodes of the TFT is not greater than about 150% of the portion of the switched silicon region in the channel area of the TFT. The ratio of the TFT channel width to channel length (the distance between the source and drain electrodes across the channel) is less than 20:1, and commonly less than 10:1, with the channel length in the range of between about 1 μm and 4 μm. The photosensor array also includes crossover regions between address lines that have substantially no silicon therebetween so that no switched silicon region exists at the crossovers.

23 Claims, 3 Drawing Sheets

SOLID STATE FLUOROSCOPIC RADIATION IMAGER WITH THIN FILM TRANSISTOR ADDRESSABLE ARRAY

BACKGROUND OF THE INVENTION

This invention relates generally to radiation imagers and in particular to large area solid state fluoroscopic imagers.

Radiation imaging commonly used for medical purposes includes radiography and fluoroscopy, a real time imaging technique. Radiography typically involves the use of higher doses of radiation to generate a low noise still image (such as on traditional x-ray film) whereas fluoroscopy typically involves the use of lower radiation levels as the total time of radiation exposure in a real time imaging procedure is longer than that required for most radiographic procedures.

Solid state devices for radiation imaging include, for example, scintillating materials that are radiation absorptive and that generate light in response to the absorption of the incident radiation, and photosensor arrays that detect the light from the scintillating materials. The electrical signals generated in the imager correspond to the intensity and spatial location of the detected incident radiation; such signals are electrically coupled to readout electrical circuits that are adapted to provide the desired presentation of images detected by the radiation imager. Solid state imaging devices are readily adapted for digital processing and are less bulky and heavy than equivalent conventional equipment, and provide performance advantages compared to the relative low dynamic range, low sensitivity, non-linear response to incident radiation, and large background fog levels inherent in most analog devices.

It is desirable that sold state radiation imaging equipment also exhibit the desirable characteristics of conventional screen or film devices, such as a large field of view, good resolution, good large-area contrast.

These desired performance characteristics of solid state fluoroscopic radiation imagers present numerous challenges with respect to the design and fabrication of switched matrix address arrays used to read respective pixels in the photosensor array. Conventional thin film transistor arrays, such as used in liquid crystal arrays, for example, typically exhibit noise levels in excess of that acceptable for a radiation imagers (transistor-generated noise generally not presenting a significant issue for satisfactory performance of a liquid crystal display). Resolving the sources of noise and identifying transistor array structures that provide low noise performance while maintaining other desired imager array operating characteristics, such as low lag, requires careful design.

It is thus an object of this invention to provide a solid state fluoroscopic radiation imager that exhibits low noise.

It is a further object of this invention to provide a solid state fluoroscopic imager that exhibits relatively low lag.

A still further object of this invention is to provide an imager that exhibits a high signal output per incident x-ray and a relatively low output capacitance.

SUMMARY OF THE INVENTION

A solid state fluoroscopic radiation imager includes a scintillator disposed to receive incident radiation and a large area photosensor array. The photosensor array comprises a plurality of photosensors arranged in a pattern so as to have a predetermined pitch the photosensors are optically coupled to the scintillator and electrically coupled to an addressable thin film transistor (TFT) array. The TFT array comprises a plurality of TFTs and associated address lines configured so as to selectively electrically address each respective photosensor, which typically is a photodiode. The photosensor array is configured to exhibit relatively low noise, comprising a plurality of low charge retention TFTs, that is a TFT having switched silicon region selected to provide low charge retention so that the TFT exhibits relatively low noise and signal offset caused by the trapping and later release of charge carriers. The numerical value of the area of the switched silicon region in square microns is not substantially greater than the numerical value of the predetermined pitch as expressed in microns. The switched silicon region comprises a channel region, a source electrode region, and a drain region, with the sum of the area of the source electrode region and the drain electrode region being not greater than about 150% of the area of the channel region.

In one embodiment of this invention the low charge retention TFT comprises substantially similarly shaped source and drain electrodes disposed opposite one another so as to form the channel region therebetween having a length corresponding to the distance between the two electrodes and a width corresponding to the width of the source and drain electrodes. In the low charge retention TFT of this invention, the ratio of the channel width to the channel length is less than about 20:1 and typically is less than 10:1, with the channel length of each low charge retention TFT being in the range between about 1 µm and 4 µm. In another embodiment of the present invention, the low charge retention TFT comprises an interdigitated TFT having a two-prong source electrode in conductive contact with the photodiode and a single prong drain electrode in conductive contact with an address line.

The switched silicon region of each low charge retention TFT additionally typically comprises a low-defect semiconductive structure having amorphous silicon (a-Si) disposed over silicon nitride such that the current-density time product of the channel region silicon is less than about 3 nanocoulombs/cm$^2$.

The low noise imager device additionally comprises a plurality of low charge retention crossovers in which respective address lines are disposed in vertical alignment with an electrically insulative material disposed therebetween, the electrically insulative material being selected such that substantially no semiconductive material is disposed therein. As a consequence, no switched silicon regions are disposed between crossovers of respective address lines in the photosensor array.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
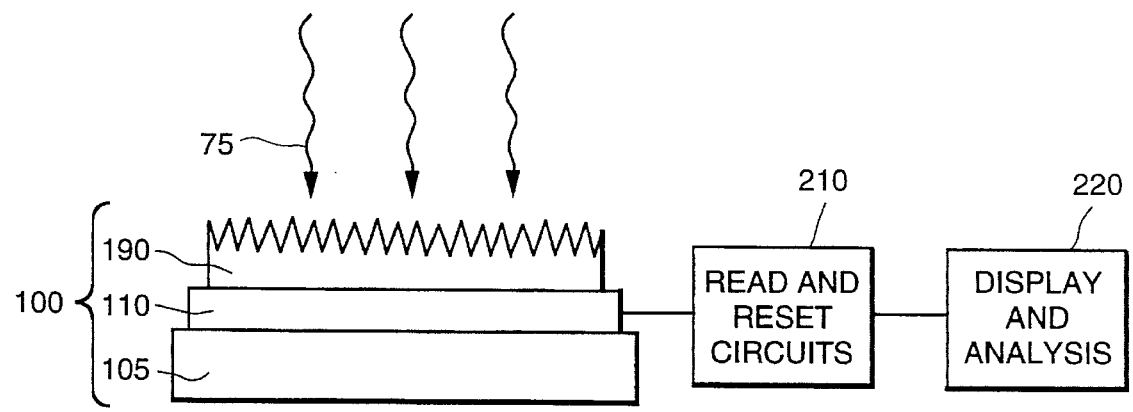
FIG. 1(A) is a cross-sectional partial schematic and partial pictorial representation of a low noise radiation imager in accordance with this invention.
FIG. 1(B) is a schematic representation of a portion of a low noise photosensor array for a radiation imager in accordance with this invention.
Figure 1:
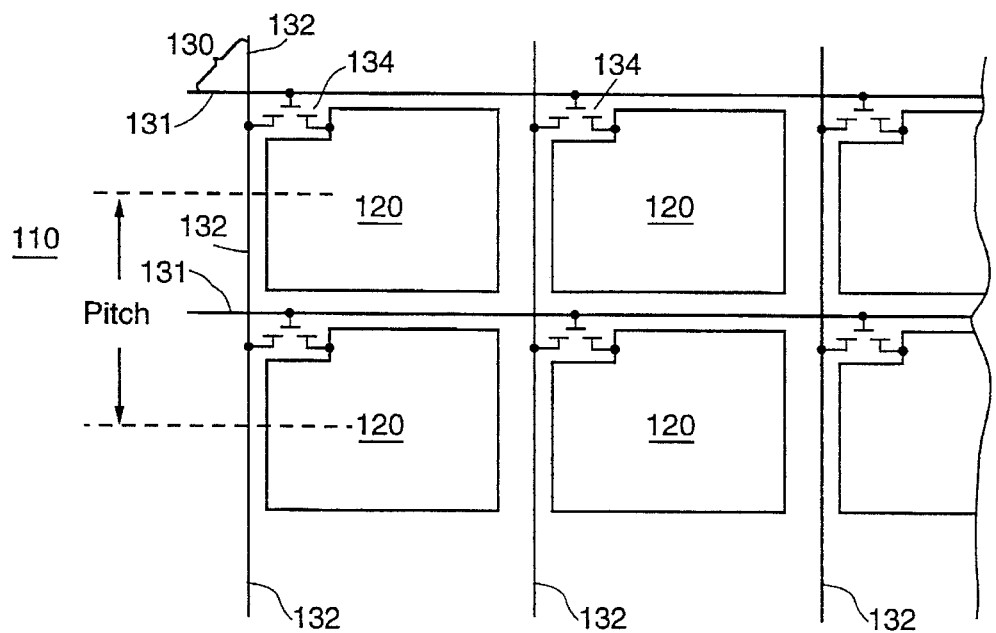

A solid state fluoroscopic radiation imager 100 comprises a photosensor array 110 disposed on a substrate 105 and a scintillator 190 disposed on photosensor array 120, as illustrated in FIG. 1. Scintillator 110 is disposed so as to receive and absorb incident radiation 75. Scintillator 190 is optically coupled to photosensor array 110 so that optical photons generated in scintillator 190 pass into photosensor array 110; photosensor array 110 is adapted so that an electrical signal corresponding to the received optical photons is generated. A read and reset circuit 210 is electrically coupled to photosensor array 110 to receive the electrical signals generated in response to incident radiation 75; read and reset circuit 210 is further coupled to display and analysis components 220 that process signals passing from the read and reset circuit to provide information to users of radiation imager 100.

As used herein, "fluoroscopic" and the like refers to substantially real-time imaging of an object exposed to incident radiation 75. Fluoroscopic imaging typically requires reading the stored (or integrated) signal (or charge) on each pixel in photosensor array 110 at a rate between about 10 to 100 frames/second or more frequently, Fluoroscopic operation thus involves an integration cycle during which each photosensor is exposed to incident light photons from the scintillator and a read cycle during which the charge generated on the photosensor from the absorption of the optical photons is read, providing a signal corresponding to the number of photons detected, and, after reading the charge, the photodiode is again returned to a known bias condition to begin the next integration cycle. As fluoroscopy requires substantially continuous exposure of the imaged object (not shown) to incident radiation 75 for periods of a few seconds to several minutes, a low noise fluoroscopic imager is advantageous insomuch as it enables the use of a lower radiation level, which is beneficial in reducing the overall radiation exposure of imaged objects.

The structure of imager 100 is configured (arranged) to detect incident radiation having a wavelength in a selected range and having a flux within a selected range so that a major portion (e.g., greater than about 50%) all of the incident radiation is absorbed in scintillator 190. Incident radiation 75 typically comprises x-rays having a wavelength within a range between about 0.0005Å and 5Å. In most fluoroscopic exams x-rays having wavelengths between about 0.1Å and 0.3Å is employed and the flux incident on the imager is typically between about 0.1 microRoentgen and 100 microRoentgen per frame. Scintillator 190 comprises a material having a relatively large cross section for incident radiation 75 such that a major portion of the radiation received by the scintillator is absorbed and generates optical photons; for example, for x-ray, scintillator 190 typically comprises thallium doped cesium iodide or the like.

Photosensor pixel array 110 comprises a plurality of photosensors 120 and an addressable thin film transistor (TFT) array 130 electrically coupled to each photosensor 120. Photosensors 120 each typically comprise an amorphous silicon (a-Si) photodiode that is readily fabricated with deposition and patterning processes that are compatible with the materials and fabrication steps for forming addressable TFT array 130. Addressable TFT array 130 comprises address lines 131, 132, typically known respectively as scan lines 131 and data lines 132, and a plurality of low charge retention TFTs 134. Scan and data lines are typically arranged in rows and columns so as to divide photosensor array 110 into a plurality of pixels 140, with one photosensor 120 disposed in each pixel and electrically coupled to a respective low charge retention TFT 134, which is in turn electrically coupled to one scan line 131 and one data line 132. Addressable TFT array 130 is adapted so that each photosensor is selectively and respectively addressable, that is the photosensor output is selectively electrically coupled to its corresponding data line 132. In this manner each photosensor can respectively be coupled to read and reset circuit 210 so that charge accumulated in photodiode 120 can be read and the photodiode returned to a known bias condition prior to the next integration cycle.

In accordance with this invention, photosensor array 110 is arranged such that the noise level of the photosensor array is comparable to the signal generated from the detection of a single photon of the incident radiation. Thus, the electronic noise generated by the imager is less than or equal to incident radiation (e.g., x-ray) quantum noise at the smallest signal level of interest, which typically is in the lowest intensity area of the fluoroscopic image. Sources of electronic noise in fluoroscopic imager 100 include the following: charge retention noise (resulting from "detrapping" of interband states in the semiconductive material of the FET after the FET is turned off (e.g., for the part of the integration cycle during which no signal is desired from the pixel)); transistor switching noise (a Johnson noise that is a function of the on-resistance of the field-effect transistor (FET)) (as used herein, Johnson noise refers to any electric noise produced by thermal agitation of electrons in conductors or semiconductors); data line resistance and distributed line capacitance, which are a function of line size, length, and the material used; and various leakage noises, e.g., from the photodiode, from the FET (typically seen when there is a relatively large signal on the diode), and from address line leakage, as at the crossover points of the scan and data lines and between the common electrode of the photosensor array and the data line.

Charge retention can represent the largest single contributor to electrical noise in an imager array used in fluoroscopic operation. It is believed that charge retention noise results from the random release of charge trapped in interband states of a-Si that are switched, that is, disposed in the channel region of the FET or are disposed between the gate electrode and the source or the drain electrode of the FET. When the FET is switched on, the change in electric field causes most of the states in the semiconductive material physically near the gate electrode to be filled to near the conductive band, whereas when the FET is switched off, the traps begin to randomly empty, with deeper traps taking a longer time to empty.

Figure 2A:
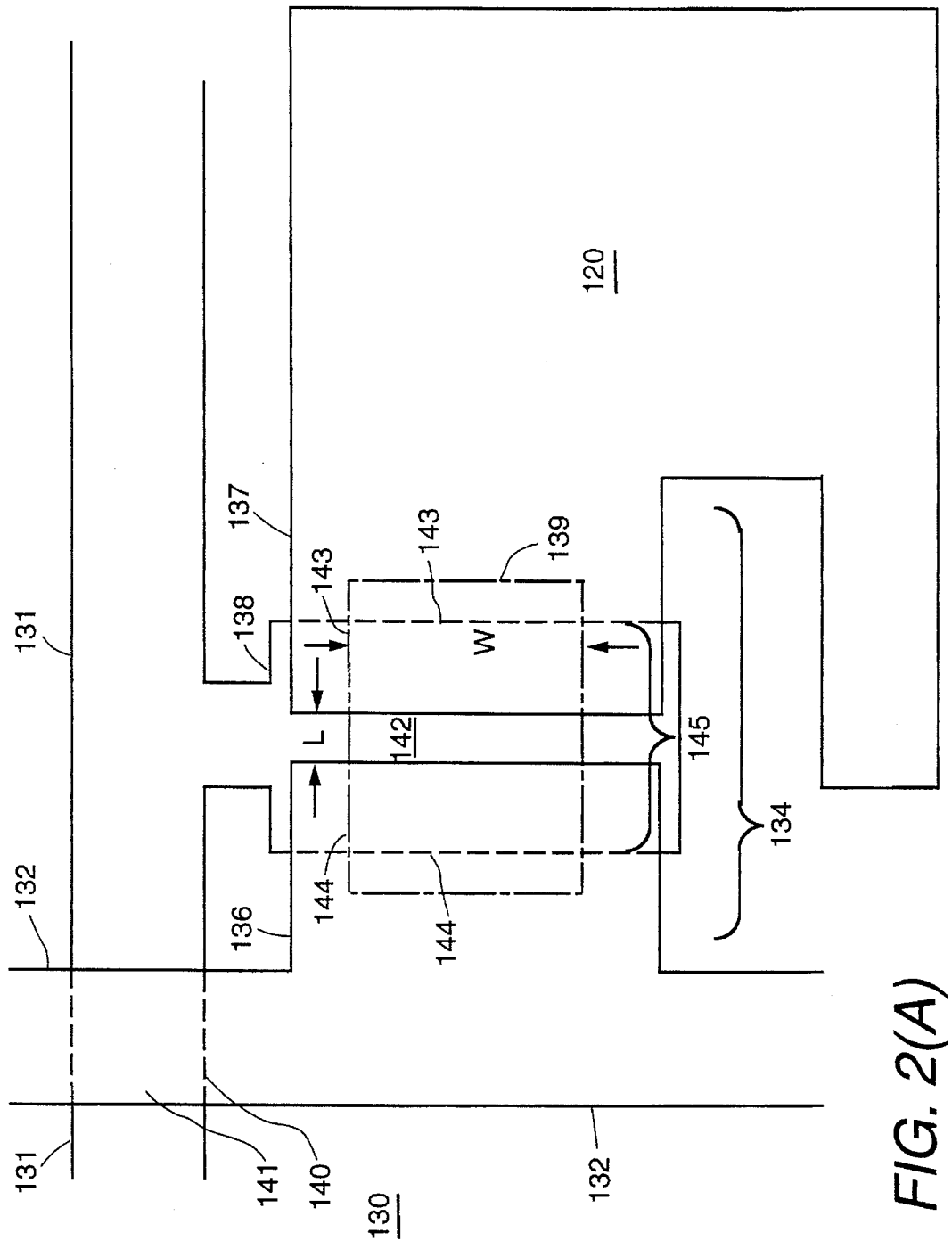
FIG. 2(A) is a representation of a low charge retention thin film transistor in accordance with one embodiment of this invention.

A representative portion of an imager array 130 comprising a low noise addressable TFT array in accordance with this invention is illustrated in the modified plan view of FIG. 2(A). Components in multiple layers (that is, some components illustrated overlie other components illustrated in this Figure) make up the low noise TFT array. Scan line 131 is typically disposed on substrate 105; and extension from scan line 131 comprises gate electrode 138 of TFT 134. A semiconductive region 139 is disposed over gate electrode 134 (with a dielectric layer (not shown), such as silicon nitride or silicon dioxide disposed therebetween). Semiconductive region typically comprises a layer of amorphous silicon (a-Si) and an overlying layer of doped a-Si (such as a-Si doped to exhibit n type conductivity), Next, the conductive material comprising data lines 132, source electrode 137, and drain electrode 136 are disposed to overly semiconductive region 139. The conductive material typically comprises chromium, aluminum, molybdenum, tungsten, titanium, and the like. Data line 132 similarly overlies scan line 131 at crossover region 140, with at least a dielectric material disposed therebetween (typically the same dielectric material disposed between gate electrode 138 and semiconductive region 139. A barrier layer (not shown) of dielectric material (such as inorganic dielectric material (silicon nitride or the like) and/or organic dielectric material (such as polyimide) is typically disposed over TFT 134 prior to the formation of photosensor 120; photosensor 120 comprises a bottom electrical contact pad (shown in outline in FIG. 2(A) but not to scale) electrically coupled to source electrode 137, an overlying photodiode body (not shown) comprising semiconductive layers (e.g., a-Si and doped silicon layers) and a common electrode (not shown) disposed over the top of the photodiode body.

A channel switched silicon region 142 comprises the portion of semiconductive region 139 that is disposed between source electrode 137 and drain electrode 136. A source electrode switched silicon region 143 comprises the portion of semiconductive region 139 that underlies source electrode 137, and a drain electrode switched silicon region 144 comprises the portion of semiconductive region 139 that underlies drain electrode 136. Collectively, channel switched silicon region 142, source electrode switched silicon region 143, and drain electrode switched silicon region 144 comprise a TFT switched silicon region 145. TFT switched silicon region 145 comprises the a-Si that is exposed to switching voltages applied to the scan line (i.e., applied to gate electrode 138 in each TFT 134) and that has a conductive path to data line 132, drain electrode, or source electrode of TFT 134. Similarly, semiconductive material disposed between scan line 131 and data line 132 at crossover 140 (that is, the semiconductive material is left disposed over the dielectric material, as is common in many TFT array fabricating procedures) comprises a crossover switched silicon region 141 in which the silicon is exposed to the switching voltages applied to scan line 131 and the silicon has a conductive path to the overlying data line 132.

TFT switched silicon regions 145 and crossover switched silicon region 141 contribute to charge retention noise in the TFT array. The charge retention noise from channel switched silicon region 142 is about 3 times greater per unit area than the charge retention noise from any other switched silicon region (i.e., source electrode switched silicon region 143, drain electrode switched silicon region 144, and crossover switched silicon region 141). In accordance with this invention, addressable TFT array 130 is configured so that the area of these switched silicon regions is optimized in order to lower noise in photosensor array 110.

In accordance with this invention, TFT switched silicon region 145 in low noise TFT 134 has an area that has a numerical value not greater than the numerical value of the pitch of imager 100 as expressed in the measurement units of the area of the switched silicon (e.g., pitch expressed in microns and switched silicon area expressed in square microns). The pitch of imager 100 is determined by the distance between the centers of pixels along a selected axis of the array (e.g., the axis of the data lines 132 as shown in FIG. 1(B)). Low noise solid state radiation imagers in accordance with this invention typically have a pitch in the range between about 35 and 500 microns. Imagers having larger areas of switched silicon exhibit higher noise than imagers having smaller areas of switched silicon; higher noise in the imager requires the use of larger x-ray exposures to obtain the same resolution image.

The area of channel switched silicon region in low noise TFT 134 comprises the silicon area disposed between the source and drain electrode and that is disposed over gate electrode 138. As illustrated in FIG. 2(A), the area of channel switched silicon region 142 is determined by channel length "L" (corresponding to the distance separating the source and drain electrodes) and channel width "W" (corresponding to the width of semiconductive region 139 underlying source and drain electrodes 137, 136 and overlying gate electrode 138).

From the standpoint of reducing charge retention, it is desirable that channel switched silicon region 142 be as small as possible as this region releases a greatest amount of charge per unit area. In design of imagers, the ratio of channel width to channel length is dictated by the necessity to limit lag to a specified value, for example, 4%. Factors such as photosensor capacitance, TFT gate insulator thickness, channel mobility, TFT operating voltages, and readout cycle timing can all raise or lower the conductance required. In addition, channel lengths should exceed 1 micron in order to avoid short channel effects (that is off-state leakage in the TFT). This leakage results from the high lateral electric fields in the short channel region at source-drain voltages in the range of about 5 V to 10 V, the range required for imager operation. Processing and lithographic technique limitations may further limit the smallest channel length that can be reliably produced in an array. In accordance with this invention, the ratio of channel width to channel length is less than about 20:1, and typically is less than about 10:1. For example, in an imager having a pitch of 100 microns, the ratio of channel width to length is about 3:1. Low charge retention TFTs in such a device typically have channel lengths in the range between about 1 μm and 4 μm, and often about 3.5 μm, and the area of the channel switched silicon region area is about 40 μm². Further, in accordance with this invention, the sum of the areas of source electrode switched silicon region 143 and drain electrode switched silicon region 144 is not greater than about 150% of the area of channel switched silicon region 142. Thus, in the example noted above, the total switched silicon region 145 would be about 100 μm², (the sum of electrode switched silicon regions 143 and 144 being less than 150% of the value of the area of channel switched silicon region 142, or 60 μm²) which corresponds to the imager pitch expressed in microns.

Further, in accordance with this invention low noise TFT array 130 comprises low charge retention crossovers 140 in which substantially no semiconductive material is disposed between scan line 131 and data line 132. Thus, the area of crossover switched silicon region 141 is essentially zero. This structure is obtained by either limiting or preventing the deposition of semiconductive material in crossover regions 140 during the transistor fabrication process, or alternatively, removing the semiconductive material (e.g., a-Si and doped a-Si) from crossover regions 140 during the patterning processes in the formation of TFTs 134.

Figure 2B:
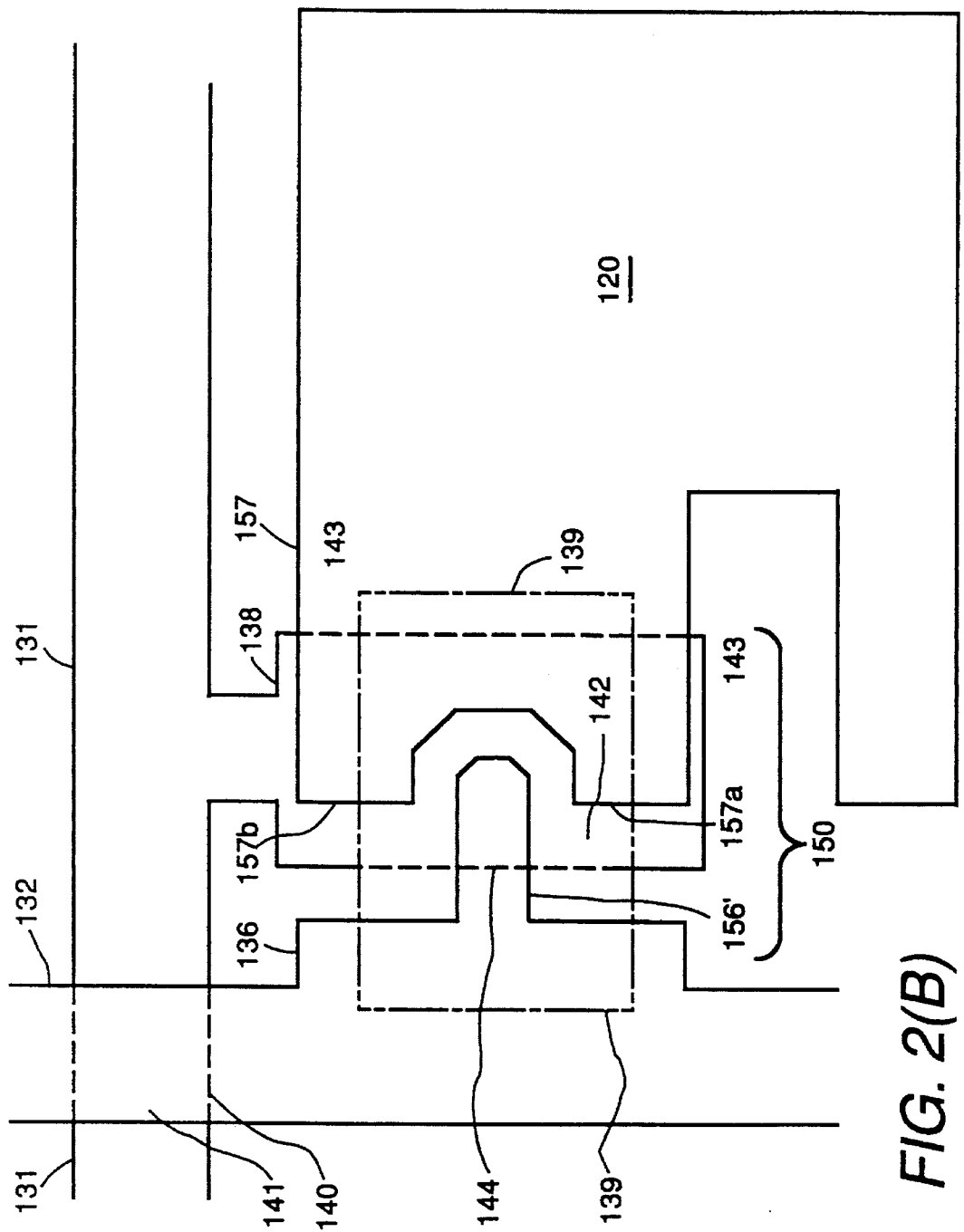
FIG. 2(B) is a representation of a low charge retention thin film transistor in accordance with another embodiment of this invention.

An alternative embodiment low noise TFT addressable array 130 comprises an interdigitated TFT 150. Except as noted herein, the structure of TFT 150 is essentially the same as that described above with respect to low charge retention TFT 134. In particular, the relative position in layers on substrate 105 (FIG. 1(A)) of components of Interdigitated TFT and the coupling to respective scan and data lines is the same as low charge retention TFT 134 illustrated in FIG. 2(A). Interdigitated TFT 150 comprises a single prong drain electrode 156' (FIG. 2(B)) disposed in conductive contact with data line 132 and a two prong source electrode 157a and 157b semiconductive disposed in electrical contact with photodiode 120. The respective source and drain electrodes are disposed over semiconductive region 139 that is in turn disposed over gate electrode 138. Drain electrode prong extension 156' is disposed between first source electrode prong 157a and a second source electrode prong 157b. Drain electrode switched silicon region 144 is disposed in the area that underlies drain electrode prong 156' and that overlies gate electrode 138; similarly, source electrode switched silicon region is disposed in the area of semiconductive region 139 that underlies two prong source electrode 157 and that overlies gate electrode 138. Channel switched silicon region 142 is disposed in the area between drain electrode prong 156' and two prong source electrode 157.

In operation, interdigitated TFT 150 lessens noise on data lines 132 (and hence noise seen by the readout circuits) as it shifts detrapped charge from the drain electrode to the source electrode. Due to the relative size of the electrodes, charge released from detrapping in the switched silicon areas tends to flow to the larger source electrode rather than the smaller drain electrode. Any detrapped charge that passes to the drain electrode is seen on data line 132 and hence contributes to noise during the readout of each pixel on that data line. Detrapped charge that migrates to the source electrode, however, is not detected by the readout circuits during the integrate portion of the cycle for that pixel; the charge collected does contribute to imager noise only during a read portion of the cycle at which time photosensor 120 is coupled to the data line through TFT 150. The detrapped charge from the source electrode seen at this time represents an amount accumulated (or averaged) over the integrate cycle and thus does not cause as significant an impact on imager noise characteristics as does detrapped charge from all other pixels on the data line that migrates to the data line during the readout of each pixel.

In either embodiment of the low charge retention TFT of the present invention (FIGS. 2(A) and (B)), semiconductive region 139 comprises a low-defect density silicon that contributes to low charge retention. Channel switched silicon region 142 further comprises a low-defect density semiconductive structure having amorphous silicon (a-Si) disposed over silicon nitride such that the current-density time product of the a-Si is less than about 3 nanocoulombs/$cm^2$. Charge retention is a current-density time product. For example, after switching the gate voltage of a FET from the on-state to the off-state (typically from +8 V to −8 V), charge continues to flow out of the source and drain electrodes of the FET for times as long as 100 seconds. This current is measured using standard procedures and equipment. The time dependence of this current is approximately $1/t$, in which time "t" is the time after the gate is switched from the on-state to the off-state. The product of the measured current and time "t" is substantially constant; when normalized to the device area, this constant is defined as the "Jt" product (that is, (current density)×(time)).

Devices in accordance with this invention have a current-density time of about 3 nanocoulombs/$cm^2$ for channel switched silicon region 142, and typically have a current-density time of about 1 nanocoulomb/$cm^2$ for the source electrode switched silicon region 143 and drain electrode switched silicon region 144 for times "t" in the range of about 10 microseconds to 10 milliseconds. The difference in the current density time product for the channel and non-channel regions is a function of the longer distance that charge released from silicon in the channel region must travel before reaching one of the electrodes: during this longer journey, the charge can become retrapped, and then re-released, resulting in the longer time for the detrapped charge to be collected at one of the electrodes.

The low-defect semiconductive structure in accordance with the present invention provides the desirably low current density time products noted above. The "Jt" current-density time product is a measure of the quality of the interface of a-Si comprising semiconductive region 139 and the underlying silicon gate dielectric layer (not shown). Such a low defect structure is obtained in accordance with the following deposition parameters for low pressure chemical vapor deposition of the silicon nitride gate dielectric layer (SiN); the a-Si semiconductor layer (a-Si) and the doped semiconductor layer (n+):

| Parameter | SiN | a-Si | n+ |
|---|---|---|---|
| power density | | | |
| (mW/$cm^2$) | 18 | 12 | 15 |
| gas flows (sccm) | | | |
| $SiH_4$ | | 500 | |
| $NH_3$ | 1333 | | |
| 1% PH3 (in $SiH_4$) | | | 100 |
| temperature (°C.) | 280 | 280 | 280 |
| pressure (mTorr) | 300 | 300 | 500 |

The electrode area in the example given above is 4,000 $cm^2$; gas flows can be appropriately scaled based upon the size of deposition chambers that are in use.

In addition to the advantageous noise characteristics provided by low charge retention TFT 134, the relatively small size of the TFT (especially resulting from the short channel lengths) enables photosensor 120 to occupy a relatively larger portion of each pixel in the array such that the "fill factor", that is the portion of each pixel that is comprised of the photodiode, is enhanced over that possible with conventional, larger TFTs.

The combination of low defect semiconductive structure of TFT 134 and the relatively small area of channel region 142 provide a TFT that has relatively low charge retention and capacitance and is thus adapted to provide desirable low noise addressable TFT array performance. For purposes of illustration and not limitation, relative contributions to noise in a solid state fluoroscopic imager are expected to be as set out below for a typical large area (e.g., 20 cm×20 cm) imager (with molybdenum split data lines, 10 cm long) in a 30 frames/sec fluoroscopic operating mode. Such an imager has a typical pixel dimension of about 200 microns, and a low charge retention TFT having a channel width (as described more fully below) of about 35 microns and a channel length (as described more fully below) of about 3.5 microns. The thickness of the intrinsic silicon layer in the p-i-n detector diode is about 1.5 microns with a resultant pixel capacitance of about 2 pF. For such an imager, the amount of noise due to the various sources described above is:

| Noise Source | % of Total Noise (variance) |
|---|---|
| Charge Retention | 48% |
| FET Switching | 28% |
| Line Resistance | 19% |

-continued

| Noise Source | % of Total Noise (variance) |
| --- | --- |
| Photodiode Leakage | 3% (at low signal) |
| FET Leakage | 2% (at high signal) |
| Other Leakage | 0.4% |

Total Noise = 890 electrons

Imager 100 is further adapted such that it exhibits low lag, e.g., about 8% or less. Lag refers to residual signal between sequential frames from a given pixel, and results from incomplete pixel readout during a given integration and read cycle. It is desirable that imager 100 exhibit low lag so that the smearing of images of moving objects is limited in fluoroscopic imaging modes. Lag resulting from finite FET conductance and low charge retention noise are anti-thetical, and thus tradeoffs must be made in the design of the TFT, e.g., optimizing the FET "on" resistance by increasing the channel width W to achieve acceptable lag while reducing the charge retention noise by decreasing W to reduce FET channel area. Lag in imager 100 can also arise from the trapping and detrapping of carriers in the photodiode. This source of lag is reduced by use of high quality a-Si in photodiode 120 (thereby minimizing deep traps in the photodiode). Scintillator 190 comprises a scintillator material that exhibits, among other things, relatively low afterglow, such as disclosed in co-pending application entitled "High Efficiency Scintillation", Ser. No. 08/061,933, filed, 17 May 1993, which assigned to the assignee of the present invention and incorporated herein by reference.

For efficient radiation imaging performance, imager 100 is further adapted such that it exhibits a high detective quantum efficiency high conversion factor, (e.g., greater than 0.5) and requires a relatively low average x-ray energy to produce each charge carrier, e.g. 40 eV per carrier. Additionally, imager 100 is adapted such that it exhibits a relatively low output capacitance, that is less than about 100 picofarads. Low output capacitance is achieved in imager 100 by the imager comprising low charge retention TFTs, which are relatively small as described above, address lines having relatively small (e.g., 40 $\mu m^2$ or less) crossover areas between scan and data lines, and further by imager 100 comprising a relatively thick (e.g., 1.3 μm or more) polyimide dielectric layer (not shown) between data lines 132 and the common electrode (not shown) of photosensor array 110.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A solid state fluoroscopic radiation imager for imaging a subject illuminated by incident radiation having wavelengths in a predetermined range, said radiation imager comprising:

a large area photosensor array comprising a plurality of photosensors arranged in a pattern so as to have a predetermined pitch, said photosensor array further comprising an addressable thin film transistor (TFT) array comprising a plurality of low charge retention TFTs, respective ones of said TFTs being electrically coupled to respective ones of said photosensors so as to selectively address respective photosensors in said photosensor array;

each of said low charge retention TFTs having a TFT switched silicon region selected to provide low charge retention; the numerical value of the area of said switched silicon region as expressed in square microns being not substantially greater than the numerical value of said predetermined pitch as expressed in microns.

2. The device of claim 1 wherein the area of said TFT switched silicon region in square microns has a value less than the value of said predetermined pitch as expressed in microns.

3. The device of claim 1 wherein said TFT switched silicon region comprises a channel region, a source electrode region, and a drain electrode region, said regions being sized such that the sum of the areas of said source electrode region and said drain electrode region is not greater than about 150% of the area of said channel region.

4. The device of claim 1 wherein at least one of said low charge retention TFTs comprises substantially similarly-shaped source and drain electrodes disposed opposite one another so as to form the channel region having a length corresponding to the distance between the two electrodes and a width corresponding to the width of said switched silicon region underlying the respective source and drain electrodes; and wherein the ratio of the channel width to the channel length of each of said TFTs is less than about 20:1.

5. The device of claim 4 wherein the ratio of the channel width to channel length of each of said TFTs is less than about 10:1.

6. The device of claim 4 wherein the channel length of each of said low charge retention TFTs is in a range between about 1μm and 4 μm.

7. The device of claim 4 wherein said TFT has a channel length and a channel width selected such that the ratio of the channel width to the channel length is such that lag induced by said TFT is less than about 4%.

8. The radiation imager of claim 7 wherein the source and drain electrodes of each of said low charge retention TFTs comprises a material selected from the group consisting of chromium, aluminum, molybdenum, tungsten, and titanium.

9. The device of claim 1 wherein at least one of said low charge retention TFTs comprises an interdigitated TFT having a two-prong source electrode disposed in electrical contact with said photosensor and a single prong drain electrode disposed in electrical contact with an address line.

10. The device of claim 1 wherein the pitch of said imager is in the range between about 35 μm and 500 μm.

11. The device of claim 1 wherein each of said TFT switched silicon regions comprises a low-defect semiconductive structure having amorphous silicon (a-Si) disposed over silicon nitride such that the current-density time product of silicon disposed in a channel region of said TFT is less than about 3 nanocoulombs/$cm^2$.

12. The device of claim 1 wherein said addressable TFT array further comprises a plurality of low charge retention address line crossovers, each of said crossovers comprising a first address line oriented along a first axis disposed in vertical alignment with an address line oriented along a second axis, said first axis being substantially perpendicular to said second axis, an electrically insulative material being disposed between said first and second address lines, said electrically insulative material being selected such that substantially no semiconductive material is disposed therein.

13. The device of claim 12 wherein no switched silicon regions are disposed between first and second address lines at said crossovers.

14. The radiation imager of claim 1 wherein the area of said imager is in the range between about 300 $cm^2$ and 2000 $cm^2$.

15. The radiation imager of claim 1 wherein each of said photosensors comprises a photodiode.

16. The radiation imager of claim 1 wherein each of said switched silicon region comprises amorphous intrinsic silicon.

17. A solid state fluoroscopic x-ray imager comprising;
- a scintillator disposed to receive said incident radiation; and
- a large area photosensor array optically coupled to said scintillator, said photosensor array comprising a plurality of photosensors arranged in a pattern so as to have a predetermined pitch, said photosensor array further comprising an addressable thin film transistor (TFT) array comprising a plurality of low charge retention TFTs disposed so as to selectively address respective photosensors in said photosensor array;
- respective ones of said TFTs being electrically coupled to a respective corresponding one of said photosensors so as to selectively couple each of said photosensors to a selected address line, each of said low charge retention TFTs having a TFT switched silicon region selected to provide low charge retention; the numerical value of the area of said switched silicon region as expressed in square microns being not substantially greater than the numerical value of said predetermined pitch as expressed in microns;
- said addressable TFT array further comprising a plurality of low charge retention address line crossovers, each of said crossovers comprising a scan line oriented along a first axis disposed in vertical alignment with a data line oriented along a second axis, said first axis being substantially perpendicular to said second axis, an electrically insulative material being disposed between said first and second address lines, said electrically insulative material being selected such that substantially no switched silicon region is disposed in said crossover.

18. The device of claim 17 wherein said TFT switched silicon area comprises a channel region, a source electrode region, and a drain electrode region, said regions being sized such that the sum of the areas of said source electrode region and said drain electrode region is not greater than about 150% of the area of said channel region.

19. The device of claim 18 wherein at least one of said low charge retention TFTs comprises substantially similarly-shaped source and drain electrodes disposed opposite one another so as to form the channel region, said channel region having a length corresponding to the distance between the two electrodes and a width corresponding to the width of said switched silicon region underlying the respective source and drain electrodes; and wherein the ratio of the channel width to the channel length of each of said TFTs is less than about 20:1.

20. The device of claim 19 wherein the ratio of the channel width to channel length of each of said TFTs is less than about 10:1.

21. The device of claim 20 wherein the channel length of each of said low charge retention TFTs is in a range between about 1 µm and 4 µm.

22. The device of claim 17 wherein at least one of said low charge retention TFTs comprises an interdigitated TFT having a two-prong source electrode disposed in electrical contact with said photosensor and a single prong drain electrode disposed in electrical contact with a respective one of said address lines.

23. The device of claim 22 wherein said single prong source electrode is disposed between the respective first and second prongs of said two-prong drain electrode.

* * * * *